United States Patent [19]
Fagin et al.

[11] Patent Number: 6,014,664
[45] Date of Patent: Jan. 11, 2000

[54] METHOD AND APPARATUS FOR INCORPORATING WEIGHTS INTO DATA COMBINATIONAL RULES

[75] Inventors: Ronald Fagin, Los Gatos; Edward Leo Wimmers, San Jose, both of Calif.

[73] Assignee: International Business Machines Corporation, Armonk, N.Y.

[21] Appl. No.: 08/920,532

[22] Filed: Aug. 29, 1997

[51] Int. Cl.$^7$ ................................................ G06F 17/30
[52] U.S. Cl. ...................................... 707/5; 707/3; 707/4
[58] Field of Search ................................. 707/5, 2, 3, 4

[56] References Cited

U.S. PATENT DOCUMENTS

| | | | |
|---|---|---|---|
| 4,531,186 | 7/1985 | Knapman | 364/300 |
| 5,020,019 | 5/1991 | Ogawa | 364/900 |
| 5,321,833 | 6/1994 | Chang et al. | 395/600 |
| 5,535,382 | 7/1996 | Ogawa | 395/600 |
| 5,600,835 | 2/1997 | Garland et al. | 707/5 |
| 5,606,690 | 2/1997 | Hunter et al. | 707/5 |
| 5,640,553 | 6/1997 | Schultz | 395/605 |
| 5,694,593 | 12/1997 | Baclawski | 707/5 |

OTHER PUBLICATIONS

*Communications of the ACM,* vol. 26, No. 12, G. Salton et al., Dec. 1983, Extended Boolean Information Retrieval, pp. 1022–1036.

*Information Sciences,* vol. 39, No. 2, D. Dubois et al., Sep. 1986, "Weighted Minimum and Maximum Operations in Fuzzy Set Theory", pp. 205–210.

*Primary Examiner*—Wayne Amsbury
*Assistant Examiner*—Cheryl Lewis
*Attorney, Agent, or Firm*—Gray Cary Ware Freidenrich

[57] ABSTRACT

A data processing system provides the correct weighted combinational function for any unweighted combinational rules applied to a database. The system receives weights to be applied to data attributes, checks for ordering conditions and if necessary re-orders the weights, and produces the correct, unique combinational function that incorporates the user weights into the base combinational rules that otherwise would be applied to retrieve desired data from the database. Thus, the invention provides unprecedented flexibility in determining the proper computation of combined scoring functions.

39 Claims, 5 Drawing Sheets

METHOD AND APPARATUS FOR INCORPORATING WEIGHTS INTO DATA COMBINATIONAL RULES

BACKGROUND OF THE INVENTION

1. Field of the Invention

This invention relates generally to computer-based evaluation of data and, more particularly, to incorporation of weights into rules for obtaining data combinational scores.

2. Description of the Related Art

There are many situations in which an organized collection of data is examined and certain combinational rules are applied to determine if one or more data items are appropriate for retrieval. For example, a database management system receives a user query that specifies data values and matches columns in data tables to retrieve the data rows that match the specified data values. A search engine for the Internet "world wide web" searches web page data to return those web pages that best match a user search query. In other situations, data that represents scores must be combined according to scoring rules to determine relative ranking of competitors.

In general, a relational database contains data that is organized into tables having tuples whose elements specify various attributes of the information in the database. That is, a database may contain data tables whose rows represent individual data records and whose columns represent data characteristics. The columns may represent different attributes or may represent the same attribute as perceived by different evaluators. For example, a financial database might contain tuples of company data in which each row of data represents an individual employee and the columns represent attributes such as employee name, address, job description, length of service, and the like. A multimedia database might contain tuples that represent characteristics of the scenes in a multimedia presentation, wherein each row of the table contains columns that represent attributes of the scenes in the presentation, such as relative color intensity (red, green, blue), image contrast, sound level, brightness, and the like. An Internet web page database may contain English language words referenced to the web pages that contain them. A scoring database might contain competitive diving or gymnastics scores, in which each row represents a different competitor and each column is a score for that competitor's performance as given by a different judge.

To determine which data should be returned to a user, it is often desirable to combine the columnar attribute data or scores into a single, combined score. This occurs, for example, where an overall score for a diving or gymnastics competitor must be computed, or where several multimedia scene attributes must be assessed and a single scene retrieved that most closely matches all the query scene attributes. An Internet search engine might rank web pages according to the number of search terms they contain and present them for retrieval. Thus, such score or attribute combining is a typical process in many types of query processing.

In the case of database management systems, users submit queries that cause the system to examine the database tuples and attempt to retrieve one or more tuples that satisfy a query. Many such queries deal with Boolean values, because most tuples either exactly match a query or do not. That is, many queries return a value of "true" or "false" for each tuple, such as a query of the form given by Query 1:

| Query 1 |
|---|
| SELECT employee WHERE NAME = "John Smith", | which returns "true" for a tuple only if the employee name is John Smith. The database management system can search the name column of the data tables until it finds one that has a value of "John Smith", a response of "true" to the query. Multimedia databases are becoming more common, and often are subjected to more "fuzzy" searches in which the attribute queries are often not "true" or "false", but somewhere in between. Thus, in a multimedia search, it often is desirable to search over attributes having a continuum of values. For example, in searching a movie database for an ocean storm scene, a user will not likely want a Boolean search that specifies whether a scene is blue or not, because the user will want to exclude landscape-sky scenes. Rather, a user likely will want to specify a "score" or rating of the blueness of a scene.

In a multimedia search, a user also is more likely to want to search over multiple properties or attributes. For example, searching for an ocean storm scene might lead a user to be interested in relatively "blue" scenes that have a relatively low level of brightness and contrast, and perhaps a high volume (sound) level. In such a circumstance, there is likely to be a score giving the blueness of each scene, a different score giving the brightness, and a different score giving the loudness of sound. These scores must be combined into a single score that determines which scenes, if any, will be returned to the user in satisfaction of the query.

As another example, in the case of competitive swimming or gymnastics, scores from several judges are typically combined so that the highest score and lowest score are eliminated and the remaining scores are averaged to produce a single score for the competitor. A database management system for implementing such combinational rules would need to automatically retrieve such scores and perform the necessary elimination and averaging calculations.

For all of the above cases, one way to determine a single, combined score over several attributes (or judge's scores) is to use fuzzy logic. Systems employing fuzzy logic generally perform well if relatively simplistic combining schemes are used. For example, a fuzzy logic selection system often employs a scoring process that assigns a single score to each row of a data table by choosing the minimum column value, thereby providing a relative attribute score (or competitor's score) over the queried properties (or competition judges). Alternatively, a fuzzy logic system might choose the maximum column score over queried properties.

It would be advantageous if a query or other data combinational rule could be of a more complicated nature. For example, a user might want to differentially value the column attributes and compute a combined score. In the case of the multimedia database example, a user might want to give greater weight to the color hue score of a scene as compared to the sound level score of a scene. An Internet search engine user might want to assign selected search words or phrases to have greater significance than others. In addition, the number of attributes or search terms over which a database is searched may change as the user refines the search and gets closer to desired results. Many systems cannot accommodate such attribute weighting or can provide it only on a very limited basis, such as when the base combinational scoring rule is to take the average of the column scores.

For example, suppose that a combinational rule for computing a score or responding to a query is to combine the values of a data row (or combine the scores of a single competitor) by taking the average value of the scores. This can be represented by the following Combination 1 rule:

---
Combination 1 - Average Value combined score = $(x_1 + x_2) / 2$,

--- which represents calculating the average of the scores $x_1$ and $x_2$, and returning the calculated value as the combined score. Thus, for any two scenes ranked by color (red-green) and brightness, the average of the color score and brightness score for the two scenes is determined (raw scores are added and the sum divided by two) and the scene with the higher average would be returned in satisfaction of the query. In this way, the scene with the highest average between blue score and brightness would be returned in satisfaction of the query.

Next, consider if a multimedia user wants to differentially value the column attributes and compute a combined score. Assume that color is more important than brightness, so that color is twice as important to the user as brightness. Using the same combinational rule to take the average of the attributes, computing the weighted score is relatively simple. For example, if $x_1$ represents color score and $x_2$ represents brightness score, then the returned combinational score should be given by Combination 2 as follows:

---
Combination 2 - Weighted Average combined score = $(\theta_1 x_1 + \theta_2 x_2)$,

--- where $\theta_1 = 0.67$ and $\theta_2 = 0.33$, and the combined score represents the weighted average of these two products. The base attribute values $x_1$ and $x_2$ of the data tuples are multiplied by the respective weights $\theta_1$, $\theta_2$ and the sums are computed. Thus, the new combined score given by Combination 2 again provides the average combined value. Suppose, however, that the combinational rule is to return the base attribute value with the minimum (or maximum) magnitude, a methodology that is common in fuzzy logic, and the user wants to differentially value one attribute as more important than the other. Conventionally, the combinational rule to use in determining a combined, weighted score from among the base data tuples is not known.

For example, with two attributes r and s, suppose the base combinational rule or function is to retrieve the tuple with the attribute having the minimum score, as represented by Combination 3:

---
Combination 3 - Min combined score = min(r, s),

--- whose result is rather straightforward for raw base scores. If a user wants to weight one of the variables or attributes more greatly than the other, it isn't clear how the new combined score would be computed. For example, a user might estimate that the r attribute is twice as important as the s attribute. It isn't clear how to calculate the new minimum combination score given the new weighting. Thus, although certain combined scoring rules are known for some base functions, such as the averaging function described above for Combination 2, it is not conventionally possible to incorporate weighting to all data base scoring functions so as to obtain the correct combined scoring function.

From the discussion above, it should be apparent that there is a need for a database processing method and system that permits weighting to be applied to combinational rules for evaluating a collection of data. The present invention fulfills this need.

SUMMARY OF THE INVENTION

The present invention permits computation of a weighted, combined score from a collection of unweighted base data combined according to base combinational rules by determining the combinational rule, or function, that applies weights to base data according to unweighted combinational rules. The weighted combined score can be computed for any collection of unweighted data after receiving the base combinational function, determining the weighted combinational function, and applying user weights to the base data attributes according to the weighted combinational function. The present invention produces the proper weighted combinational function by applying a general weighting rule to any unweighted combinational function for any collection of unweighted data on which a combination score or other attributes will be computed. More particularly, the present invention produces a combined scoring function that uniquely provides the correct weighted combinational function $f(X)$, given by the following General Weighting Rule:

---
General Weighting Rule $f(X) = m\, \theta_m\, b_{\{1,2,\ldots,i\}}(X) + \Sigma\, i\, (\theta_i - \theta_{i+1})\, b_{\{1,2,\ldots,i\}}(X)$,

--- where: the subscript of the weights $\theta$ indicates a weight value; the terms $b_{\{1, 2, \ldots, i\}}(X)$ are the values of the base function with arguments $x_1, x_2, \ldots, x_i$; and the summation is over the range i=1 to (m−1), where m is the number of attributes, or table columns and indicates cardinality with respect to the collection of scoring, functions and weights. The General Weighting, Rule also assumes that the weights are in descending order so that $\theta_1 >= \theta_2 >= \theta_3 \ldots >= \theta_m$. It should be noted that, if the latter weight ordering assumption is not true, then a processor implementing the invention can cause the data to be re-ordered so that it satisfies $\theta_1 >= \theta_2 >= \theta_3 \ldots >= \theta_m$.

The invention recognizes that a weighted combinational rule that correctly applies a collection of weights to a group of data must satisfy the following three requirements: (1) the weighted collection of scoring functions, with weights set equal, should be the same as the corresponding unweighted scoring function; (2) if a given weight is zero, then the corresponding function attribute can be eliminated from the computation without affecting the combined score; and (3) if two weightings may be called order-equivalent, meaning that they agree on the order of importance of the arguments, then the weighting that is midway between the two order-equivalent weightings must produce a combined score that is midway between the two scores produced by the given weightings individually. Those skilled in the art will be able to verify that the General Weighting Rule provides weighted combinational functions that satisfy these three requirements. Thus, the present invention provides a means of determining the heretofore unknown weighted combinational function that applies user weights to a collection of data. The weighted combinational function provided by the invention will be the unique, correct function that guarantees the correct application of user weights to the base data.

With respect to the third criterion of order-equivalence, a weighting $\theta_1, \theta_2, \theta_m$ is order-equivalent to a weighting $\alpha_1$, $\alpha_2, \ldots, \alpha_m$ if there do not exist any i, j with both $\theta_i < \theta_j$ and $\alpha_j < \alpha_i$ being true. For example, the weighting (0.2, 0.7, 0.1) is order-equivalent to the weighting (0.3, 0.5, 0.2) because in both cases the second weighting in the order is largest, the first weighting is next largest, and the third weighting is smallest.

The application of the present invention will be better understood with reference to the following example:

For example, in the case of the Combination 3 combinational rule for finding the minimum described above, the present invention quickly leads to the result that the correct weighted combination score is given by the following Combination 4:

| Combination 4 - Weighted Combinational Function |
| --- |
| combined score = 2 (1 − θ) min(r, s) + (2θ − 1) r, | where a weight θ is assigned to an attribute r and the weight assigned to the attribute s is (1−θ), and it is assumed θ>=½. The present invention therefore provides an easily computed result for which there is no readily known solution. It should be noted that no additional computation of the tuple values is necessary, rather, the preexisting base data can be utilized in determining the tuples that satisfy the query with the new weighted values.

It also should be noted that the result obtained in Combination 4, for most persons, is not intuitive. The result, however, is easily verified to be accurate by using values of 0.5 for θ, in which case the combined score reduces to min(r, s), as it should, and can be verified by using 1.0 for θ, in which case the combined score reduces to r, as it should.

In this way, the present invention can provide the correct weighted collection of base scoring functions, which will be the correct function if it exists, and can do so while satisfying the criterion listed above. Thus, the invention provides unprecedented flexibility in determining the proper computation of weighted, combined scoring functions. The invention is applicable to many different data processing tasks, such as database management systems, Internet search engines, and multimedia database search systems where users are most likely to have multiple attribute searches with variable scoring function weights. In that regard, the invention is particularly suited to application with continuously variable weighting functions, such as are typically provided by "sliders" of a graphical user interface.

Other features and advantages of the present invention should be apparent from the following description of the preferred embodiment, which illustrates, by way of example, the principles of the invention

DESCRIPTION OF THE PREFERRED EMBODIMENT a. System Configuration

Figure 1:
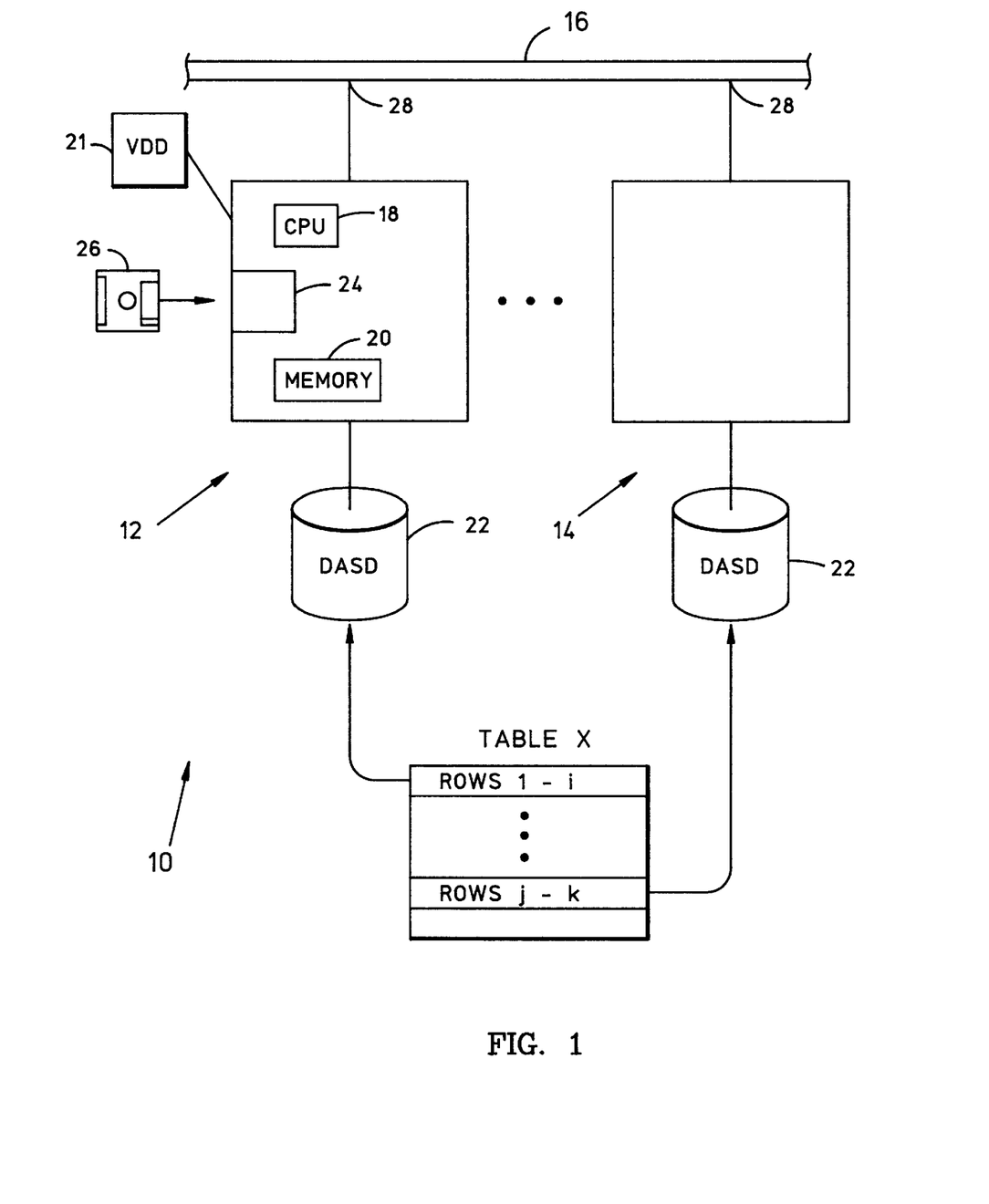
FIG. 1 is a representation of a computer system constructed in accordance with the present invention for supporting multimedia queries.

FIG. 1 illustrates an exemplary computing system 10 constructed in accordance with the present invention. The preferred embodiment will be described with respect to a network implementation, but it should be understood that the invention in no way depends on a network configuration for successful implementation. The exemplary system 10 includes multiple computers, two of which 12, 14 are shown, connected to a communication network 16. Each of the illustrated computers 12, 14 has a similar construction, so that details described with respect to one computer will be understood to apply to all computers of the system. Each computer includes a central processing unit (CPU) 18, an operating main memory 20, a video display device (VDD) 21, and a local direct access storage device (DASD) 22, such as a disk drive. Each computer communicates with the others via the network 16, thereby making each computer a network node.

The DASD units 22 of each computer contain table data that comprises a data processing system containing tuples of data stored in tables. The data processing system 10 can comprise, for example, a data base management system (DBMS) that contains alphanumeric data, such as company financial data or banking information, or can contain multimedia data, such as data relating to attributes of scenes in a multimedia presentation, or can comprise an Internet search retrieval system. The tuples of data effectively comprise base scoring functions that provide a score (columns of the tables) associated with particular data elements (rows of the tables). For example, multimedia tables might be organized so that each row of a table corresponds to a scene or predetermined time slice of a multimedia presentation, such as a movie. The columns of the table might contain values (scores) that relate to scene color, contrast, brightness, loudness and the like. In this way, by providing the data tables, users are providing a set of base scoring functions. Alternatively, the base values can be computed by a fixed or predetermined method from values stored in data tables. With respect to the competitive diving and gymnastics examples given above, the tables might contain scores provided by judges. Other suitable examples will occur to those skilled in the art.

Figure 2:
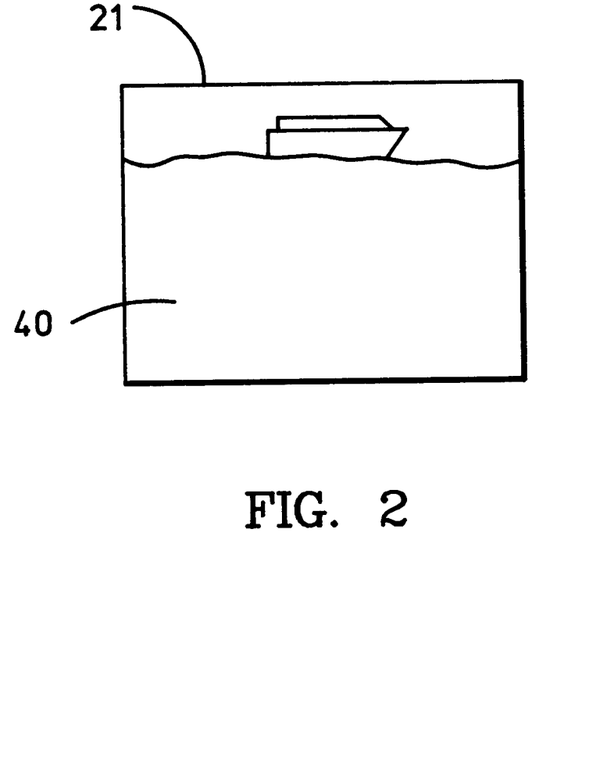
FIG. 2 is a representation of a display image of the system illustrated in FIG. 1, showing an ocean scene that might be the object of a multimedia query.
Figure 3:
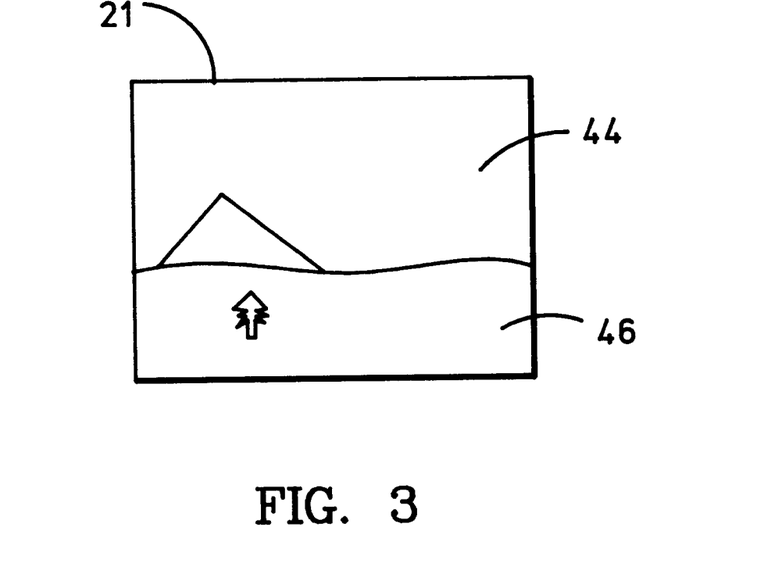
FIG. 3 is a representation of a display image of the system illustrated in FIG. 1, showing a landscape that might be the object of a multimedia query.

The users of the system 10 can submit queries that are evaluated over the database to retrieve tuples (table entries) that satisfy the query criterion. For example, a user might wish to find an ocean storm scene, and therefore would want to exclude landscape scenes. FIG. 2 is a representation of a display image of the FIG. 1 system showing an ocean storm scene displayed on the VDD 21 having a mostly blue colored area 40 representing the ocean. It is likely that the sound level associated with the scene represented in FIG. 2 is of increased loudness. FIG. 3 is a representation of a display image of the FIG. 1 system showing a landscape scene having a mostly blue area 44 representing the sky above a foreground land area 46. It should be apparent that a variety of attributes would describe and distinguish these two scenes and that a Boolean search over the attributes of these scenes (and over the other scenes in the multimedia database) might not yield optimal results.

In accordance with the present invention, the system 10 provides an interface to the users that computes the weighted collection of the base scoring functions, based on variable weights for the attributes received from the users. The interface can be provided by an application program that resides in each computer (FIG. 1) 12, 14 or can be installed on a single file server computer of the network 16. In the illustrated system 10, data files are distributed across the DASD units of the network. Thus, a Table X of the data files in the system 10 shown in FIG. 1 contains rows that are stored across the computers of the network 16. Rows 1 through i, for example, are stored in DASD of the first computer 12, rows j through k are stored in DASD of the second computer 14, and the remaining rows are stored in other network computers (not illustrated).

b. Computer Configuration

Each computer CPU 18 performs its functions by executing instructions stored in the operating memory 20. The instructions can be received through an optional storage drive 24 or through an interface with the network 16. The storage drive permits a program product storage device 26 to be received and for program steps recorded on the program product storage device to be read and transferred into the operating memory 20. In this way, the processing steps necessary for operation in accordance with the invention can be embodied on a program product. Those skilled in the art will appreciate that the program products can comprise machine-readable storage devices 26 such as magnetic media disks on which are recorded program instructions whose execution implements the computer data processing system of the present invention.

The storage devices 26 also can comprise, for example, media such as optical disks (such as CD-ROM) and other machine-readable storage devices. Other suitable program product storage devices can include magnetic tape and semiconductor memory cards. Alternatively, the program steps can be received into the operating memory 20 from the DASD 22, or over the network 16. In the case of the latter method, the computer system includes a network interface 28 that permits communication between the CPU 18 at the first node 12 and other computer systems 14 over the network 16. In that way, the computer system 12 can receive data into the main memory 20 through the interface 28 after network communication has been established by well-known methods that will be understood by those skilled in the art without further explanation.

Figure 4:
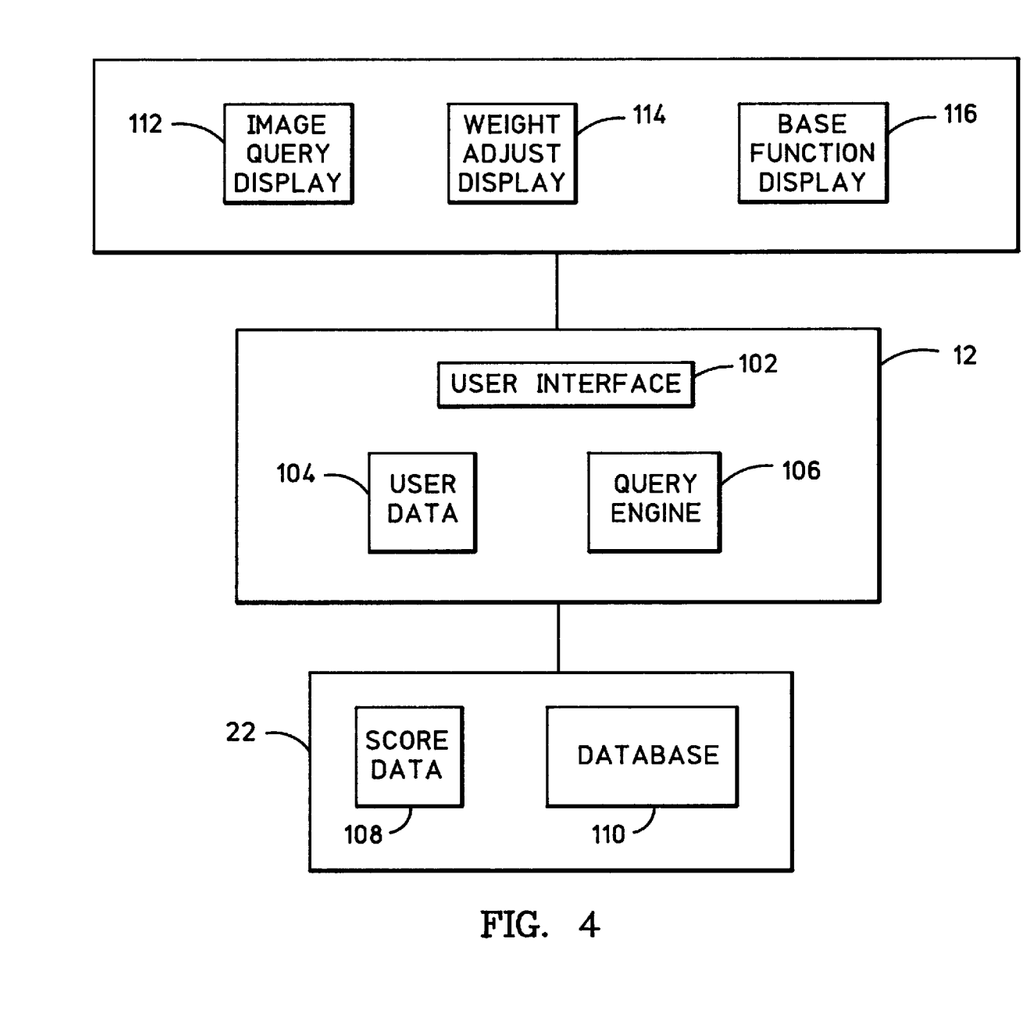
FIG. 4 is a representation of a computer multimedia processing system adapted for image retrieval from a multimedia database.

FIG. 4 illustrates the functional relationships in the operating environment of the computer system generally, and in particular between the computer 12, display device 21, and data storage 22. FIG. 4 shows that the computer includes a user interface 102 that makes use of user data 104 stored in the computer, typically stored in the memory (FIG. 1). In the illustrated embodiment of FIG. 1 and FIG. 4, a user works through the user interface to submit queries to a query engine 106 that operates on score data 108 derived from the raw data of the database 110. The query engine may comprise, for example, an Internet-based search engine for the "world wide web" or may be a database management system (RDBMS) that retrieves data records from large business data files.

In the preferred embodiment, the user interface 102 provides a menu-driven visual display on the video display device 21 comprising multiple display "windows" or "pages" through which users interact with the data processing system to gain access to the query engine 106. One such display window depicted in FIG. 4 is the image query display 112, through which a user fashions a query and submits it to the system. In a multimedia system, for example, the image query display includes either alphanumeric input display boxes for query input or visual "thumbnail" icons with which a user may specify an image-based query, or provides a combination of both. The user interface also provides a weight adjust display 114, through which a user can change the weight values assigned to attributes specified in a query, as described further below. Finally, the user interface provides a base function display 116, through which the user inputs the base functions that determine how the attributes will be combined to achieve a final score. The base function display permits function-by-function specification of the base functions, but also permits the user to specify a data file or other more compact representation of the base functions, such as where the functions may comprise system function calls (such as subroutines) or the like.

c. Data Processing System Operation

Figure 5:
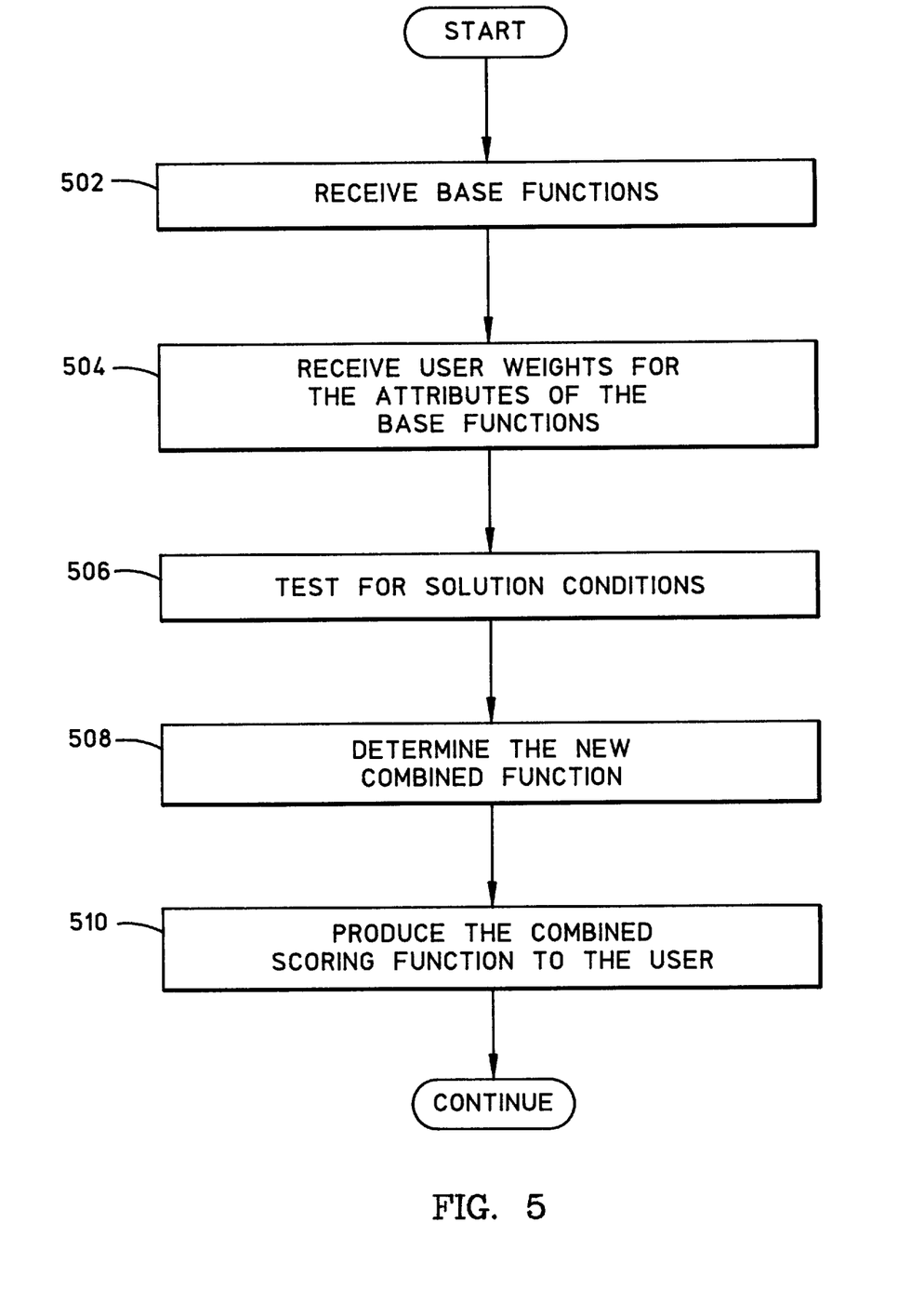
FIG. 5 is a flow diagram that illustrates the processing steps executed by the computer processing system of FIGS. 1 and 4 in computing the collected weighted scoring functions over the database and retrieving appropriate scenes, in accordance with the invention.

FIG. 5 is a flow diagram that illustrates the operating steps executed by the data processing system constructed in accordance with the invention. These steps are implemented as computer program steps stored in one of the network computers 12, 14. In the FIG. 5 flow diagram, it is assumed that the database 110 (FIG. 4) has already been received into the computer system and the corresponding score data 108 has already been computed or otherwise entered. The first flow diagram box of FIG. 5, numbered 502, represents the input of the base functions into the computer system from the user, where the computer accepts function coefficients or a subroutine specification, or a data path to a function specification. Those skilled in the art will be readily familiar with the manner in which functions can be represented by data, and therefore such techniques will not be described herein. For example, systems permit users to enter arithmetic operators and functions such as multiplication, addition, min, max, and also numerical coefficients for such operators, to thereby form the terms of base scoring functions and base combinational functions. The base functions also can comprise subroutine calls. In this way, the combinational rules such as the examples Query 1, Combination 1, Combination 2, Combination 3, and Combination 4 above can be entered quite easily. This occurs in step 502.

The next step of processing is represented by the flow diagram box numbered 504 and comprises receiving the user weights for the base functions. As noted above, the weights comprise coefficients applied to the attributes represented by the base functions, and the weights must equal the sum of 1.0 in total. The system indicates an error to the user if the received user weights does not total to one. As an alternative, the system can instead normalize the weights so they add up to 1.0 by dividing all the weights by the initial weight sum. For example, if the weights are given by (0.7, 0.5, 0.8), then their sum is equal to 2.0, and the weights should all be divided by 2.0 to provide normalized weights of (0.35, 0.25, 0.4).

The next processing step is represented by the flow diagram box numbered 506, in which the weight ordering conditions for proper solution are checked. As noted above, the General Weighting Rule for a set of weights $\Theta = \{\theta_1, \theta_2, \ldots, \theta_m\}$ requires that the weights be ordered so that $\theta_1 >= \theta_2 \ldots >= \theta_m$. The processing of step 506 checks to be certain this requirement is met. If the weights do not follow this ordering, then the system of the preferred embodiment re-orders the weights so the collection is in compliance.

With the weights properly ordered, the system can next apply the General Weighting Rule to produce the weighted combinational function. This processing is represented by the flow diagram box numbered 508. In general terms, the General Weighting Rule that provides the combined scoring function is given by the following:

| General Weighting Rule |
|---|
| $f(X) = m\, \theta_m\, b_{\{1,2,\ldots,i\}}(X) + \Sigma\, i\, (\theta_i - \theta_{i+1})\, b_{\{1,2,\ldots,i\}}(X),$ | where the subscript indicates the weighting value and the m indicates cardinality with respect to the collection of scoring functions and weights, and the summation is over the range i=1 to (m−1). As noted above, the General Weighting Rule provides the only function that properly applies the weights to the base combinational rules to the base data. The resulting weighted combinational function can then be applied to a selected database to perform query solution, database searching and manipulation, score computation, and the like.

The uniqueness of the weighted combinational function obtained in accordance with the present invention may be further explained as follows. The inventors have discovered that the correct weighted combinational function must meet three criterion: (1) the weighted collection of scoring functions, with weights set equal, should be the same as the corresponding unweighted scoring function; (2) if a given weight is zero, then the corresponding weighted combinational function attribute can be eliminated from the computation without affecting the combined score; and (3) if two weightings are order-equivalent, then the weighting that is midway between the two order-equivalent weightings must produce a combined score that is midway between the two scores produced by the given weightings individually. The first condition will be referred to as the weighted collection of scoring functions being based on the unweighted collection of scoring functions. The second condition will be referred to as the weighted collection of scoring functions being compatible over the same index (cardinality) set. The third condition will be generally referred to as the weighted collection of scoring functions being locally linear.

With respect to the third condition, two weightings are order-equivalent if they agree on the order of importance of the arguments. That is, a weighting given by $\theta_1, \theta_2, \ldots, \theta_m$ is order-equivalent to a weighting $\alpha_1, \alpha_2, \ldots, \alpha_m$ if there do not exist any i, j with both $\theta_1 < a_j$ and $\alpha_j < \theta_i$ true. For example, the base score weighting (0.2, 0.7, 0.1) is order-equivalent to the weighting (0.3, 0.5, 0.2) because in both cases the second weighting in the order is largest, the first weighting is next largest, and the third weighting is the smallest. If the order-equivalent quality holds for any two weightings, then the third condition further requires that the weighting midway between the two order-equivalent weightings must produce a combined score that is midway between the two scores produced by the given weightings individually. Given these definitions, the third condition above is satisfied if, whenever two functions are order-equivalent, the functions obey the rule given by the following local linearity rule:

| Local Linearity Rule |
|---|
| $f_\Theta(X) = \alpha\, f_{\Theta'}(X) + (1 - \alpha)\, f_{\Theta''}(X),$ |

The local linearity rule may be restated in greater detail as follows:

| Local Linearity conditions |
|---|
| If three different weightings $\Theta, \Theta', \Theta''$ are given by:<br>$\Theta = (\theta_1, \theta_2, \ldots, \theta_m),$<br>$\Theta' = (\theta_{1'}, \theta_{2'}, \ldots, \theta_{m'}),$ and<br>$\Theta'' = (\theta_{1''}, \theta_{2''}, \ldots, \theta_{m''}),$<br>and if the following condition is true:<br>$\Theta = \alpha \Theta' + (1 - \alpha)\Theta'',$<br>then it also is true that:<br>$f_\Theta(X) = \alpha\, f_{\Theta'}(X) + (1 - \alpha)\, f_{\Theta''}(X),$ | where $f_\Theta$ is the scoring, function in the weighted case when the weighting is $\Theta$. The weightings are said to satisfy local linearity.

The present invention produces a weighted, combined scoring function that uniquely provides the correct combinational function for applying weights to a collection of data. That is, the combined scoring function provided by processing in accordance with the invention is the only scoring function that provides a correct scoring function that combines the collected data and the weights. This processing, which produces the combined scoring function, is represented in FIG. 5 by the flow diagram box numbered 508.

The last step of processing illustrated in FIG. 5 is represented by the flow diagram box numbered 510, which is to provide the combined function to the user through a display window of the VDD 21 (FIG. 1). System processing then continues with additional queries or weighting adjustments, as desired.

d. Weighting Adjustment

Figure 6:
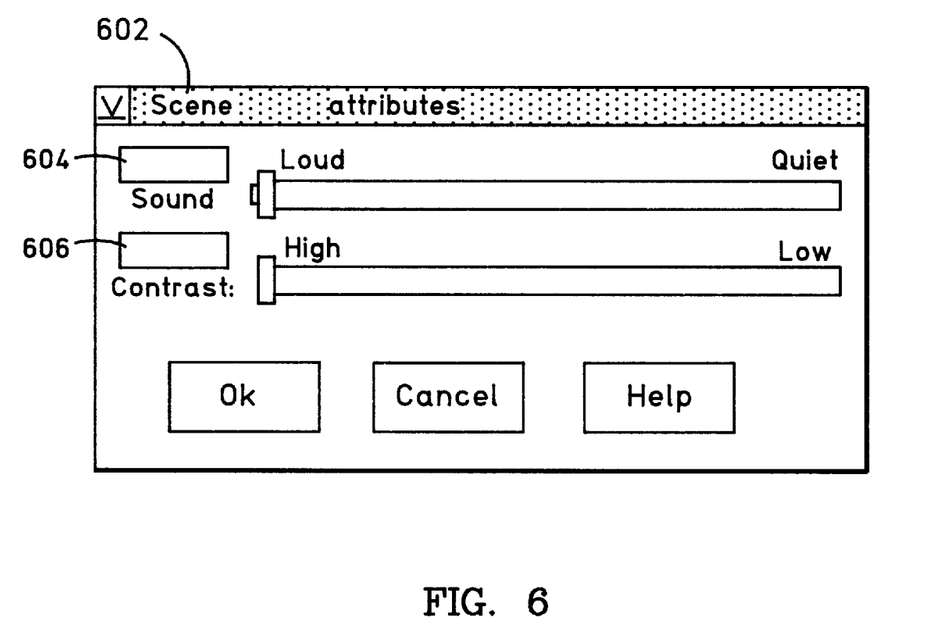
FIG. 6 is a representation of a graphical slider displayed by the computer systems of FIGS. 1 and 4 to permit a user to continuously adjust the weighting to be applied to the base functions.

As noted above, a user may wish to adjust the weights applied to the attributes of queries, especially so in the context of multimedia databases. In that circumstance, the DBMS provides a weight adjustment display 114 (FIG. 4) under control of the user interface. FIG. 6 is a representation of a "slider" implementation of the weight adjustment, as viewed by the user on the VDD 21. The weight adjustment display comprises a "scene attributes" window 602 from which a user can adjust sound and contrast attributes of a query.

The user interface 102 (FIG. 4) automatically permits adjustment of each attribute specified by the user in a query by providing a weight adjustment display, and optionally can provide a numerical display of relative slider position 604, 606 for each attribute. From FIG. 6, it should be clear that the weight value can be varied continuously from a minimum value to a maximum value for each attribute. For a given set of slider attributes, the DBMS automatically apportions the relative values so the sliders impart a total of 1.0 weighting over all attributes, in accordance with the conditions for determining a combined function in accordance with the invention.

e. Examples

The processing of the database management system in accordance with the present invention will be better understood with reference to the following examples of scoring function combinations. The first example assumes a base scoring function comprising the following:

| Example 1 "min" Base Scoring Function |
| --- |
| min(r, l) | with a weighting value $\theta$ applied to r, and therefore a weighting of $(1-\theta)$ applied to l. It should be clear from the discussion above that these parameters are specified by the user for a particular collection of data.

The General Weighting Rule of the novel weighted combinational function processing described herein dictates that the following combined scoring function is proper for the base combinational function given by min(r, l):

| Example 1 Function Table | |
| --- | --- |
| if $0 <= \theta <= 1/2$: | $2\theta \min(r, l) + (1 - 2\theta)l$ |
| if $1/2 < \theta <= 1$: | $2(1 - \theta) \min(r, l) + (2\theta - 1)r$ |

The second example utilizes a three-attribute function collection. That is, a three-attribute base scoring function is used, so that the base functions will comprise the possible combinations of functions including the cases where one or more of the weights are zero. Thus, the functions of Example 2 are represented as "B" functions and are generally specified by:

| Example 2 Base Scoring Functions | | | | | | |
| --- | --- | --- | --- | --- | --- | --- |
| B(a, b, c) | B(a, b) | B(a, c) | B(b, c) | B(a) | B(b) | B(c) |

The weights to be applied to the Example 2 functions must satisfy the following conditions:

| Example 2 Weights | | |
| --- | --- | --- |
| $\theta_1 >= \theta_2 >= \theta_3$ | $\theta_1 + \theta_2 + \theta_3 = 1$ | $0 <= \theta_1, \theta_2, \theta_3$ |

Finally, the combined scoring function will be given by the equation:

| Example 2 Combined Scoring Function |
| --- |
| $F(a, b, c) = 3 \theta_3 B(a, b, c) + 2(\theta_2 - \theta_3) B(a, b) + (\theta_1 - \theta_2) B(a)$ |

In view of the examples above, it should be apparent that for a four-attribute collection of scoring functions, the combined scoring function is given by the equation:

| Example 3 Combined Scoring Function |
| --- |
| $F(a, b, c, d) = 4 \theta_4 B(a, b, c, d) + 3(\theta_3 - \theta_4) B(a, b, c)$ $+ 2(\theta_2 - \theta_3) B(a, b)$ $+ (\theta_1 - \theta_2) B(a).$ |

It should be apparent that the Example 3 combined scoring function weights $\theta_1$, $\theta_2$, $\theta_3$, $\theta_4$ also must satisfy conditions similar to those of the other examples, to wit:

| Example 3 Weights | | |
| --- | --- | --- |
| $\theta_1 >= \theta_2 >= \theta_3 >= \theta_4$ | $\theta_1 + \theta_2 + \theta_3 + \theta_4 = 1$ | $0 <= \theta_1, \theta_2, \theta_3, \theta_4.$ |

Those skilled in the art should be able to provide examples for other weighting combinations without further explanation.

Advantages of the Invention

A data processing system constructed in accordance with the present invention provides the correct weighted combinational function that incorporates user weights to base combinational rules that otherwise are used to retrieve selected data or combine data into new information, such as a data ranking. The weighted combinational function is the correct, unique function that incorporates user weights into the base functions, and this characteristic holds true for any base function, including base functions comprising arithmetic mean, minimum, maximum, geometric mean, Euclidean distance, and so on. Conventionally, weight adjustments and resulting weighted combinational scoring functions are typically possible only for certain known base combinational functions, such as determining the average value of multiple attributes. Thus, the invention provides unprecedented flexibility in determining the proper computation of combined scoring functions.

The present invention has been described above in terms of a presently preferred embodiment so that an understanding of the present invention can be conveyed. There are, however, many configurations for computer processing systems not specifically described herein, but with which the present invention is applicable. The present invention should therefore not be seen as limited to the particular embodiment described herein, but rather, it should be understood that the present invention has wide applicability with respect to computer processing systems generally. All modifications, variations, or equivalent arrangements and implementations that are within the scope of the attached claims should therefore be considered within the scope of the invention.

We claim:

1. A computer method of incorporating user weights into base combinational functions that operate on data stored in data storage of a computer processing system to retrieve desired data, the method comprising the steps of:

receiving a collection of base scoring function data;
   receiving a set of user weight data corresponding to each of the base scoring functions;
   testing the received user weight data for solution conditions; and
   determining a new combinational scoring function over the weighted collection of base functions.

2. A method as defined in claim 1, wherein the step of receiving base scoring, function data comprises receiving data defining a subroutine that implements one or more of the base scoring, functions.

3. A method as defined in claim 1, wherein the step of receiving base scoring function data comprises receiving function coefficients and operation data from the user that specifies one or more of the base scoring, functions.

4. A method as defined in claim 1, wherein the step of receiving user weight data comprises receiving data that defines a weight value that is substantially continuously adjustable in the range of zero to one.

5. A method as defined in claim 1, wherein the step of testing the received data includes checking to ensure that the sum of weight data is equal to one.

6. A method as defined in claim 1, wherein the step of testing the received user weight data comprises the steps of:

determining if the collection of weight data values $\Theta = \{\theta_1, \theta_2, \ldots, \theta_m\}$ is ordered so that $\theta_1 >= \theta_2 \ldots >= \theta_m$; and ordering the user weight data in descending order if the step of determining shows that it was not so originally ordered.

7. A method as defined in claim 1, further including the step of retrieving database matches that satisfy the weighted combinational function.

8. A method as defined in claim 1, wherein the determining step comprises applying a General Weighting Rule, with the General Weighting Rule given by the following: $f(X) = m\theta_m b_{\{1, 2, \ldots, i\}}(X) + \Sigma i(\theta_i - \theta_{i+1}) b_{\{1, 2, \ldots, i\}}(X)$.

9. A method as defined in claim 1, further comprising the step of receiving a base combinational function.

10. A method as defined in claim 9 wherein the base combinational function that is received is the minimum function.

11. A method as defined in claim 9 wherein the base combinational function that is received is the maximum function.

12. A method as defined in claim 9 wherein the base combinational function that is received is the geometric mean function.

13. A method as defined in claim 9 wherein the base combinational function that is received is the Euclidean distance function.

14. A data processing system comprising:

a central processing unit;

one or more data storage devices in which data is stored for retrieval by the data processing system; and a query engine that receives database queries from a system user and processes them to retrieve data from the data storage devices, wherein the query engine:

receives a collection of base scoring function data, receives a set of user weight data corresponding to each of the base scoring functions, tests the received data for solution conditions, and determines a new combinational scoring function over the weighted collection of base functions.

15. A data processing system as defined in claim 14, wherein the query engine receives the base scoring function data by receiving data defining a subroutine that implements one or more of the base scoring functions.

16. A data processing system as defined in claim 14, wherein the query engine receives base scoring function data by receiving function coefficients and operation data from the user that specify one or more of the base scoring functions.

17. A data processing system as defined in claim 14, wherein the query engine receives user weight data by receiving data that defines a weight value that is substantially continuously adjustable in the range of zero to one.

18. A data processing system as defined in claim 14, wherein the query engine tests the received data by checking to ensure that the sum of weight data is equal to one.

19. A data processing system as defined in claim 14, wherein the query engine tests the received user weight data by determining if the collection of weight data values $\Theta = \{\theta_1, \theta_2, \ldots, \theta_m\}$ is ordered so that $\theta_1 >= \theta_2 \ldots >= \theta_m$, and by ordering the user weight data in descending order if it is determined that the user weight data was not so originally ordered.

20. A data processing system as defined in claim 14, further including the step of retrieving database matches that satisfy the weighted combinational scoring function.

21. A data processing system as defined in claim 14, wherein determining a new combinational scoring function over the weighted collection of base functions comprises applying a General Weighting Rule, with the General Weighting Rule given by the following: $f(X) = m\theta_m b_{\{1, 2, \ldots, i\}}(X) + \Sigma i(\theta_i - \theta_{i+1}) b_{\{1, 2, \ldots, i\}}(X)$.

22. A data processing system as defined in claim 14, wherein the query engine further receives a base combinational function.

23. A data processing system as defined in claim 22 wherein the base combinational function that the query engine receives is the minimum function.

24. A data processing system as defined in claim 22 wherein the base combinational function that the query engine receives is the maximum function.

25. A data processing system as defined in claim 22 wherein the base combinational function that the query engine receives is the geometric mean function.

26. A data processing system as defined in claim 22 wherein the base combinational function that the query engine receives is the Euclidean distance function.

27. A program product, tangibly embodying a program of machine-readable instructions executable by a computer system, the program product comprising:

a recordable media; and a data processing system (DP) recorded on the recordable media, the DP having a query engine that executes steps comprising:

receiving a collection of base scoring function data, receiving a set of user weight data corresponding to each of the base scoring functions, testing the received user weight data for solution conditions, and determining a new weighted combinational function over the weighted collection of base functions.

28. A program product as defined in claim 27, wherein the query engine step of receiving base scoring function data comprises receiving data defining a subroutine that implements one or more of the base scoring functions.

29. A program product as defined in claim 27, wherein the query engine step of receiving base scoring function data comprises receiving function coefficients and operation data from the user that specify one or more of the base scoring functions.

30. A program product as defined in claim 27, wherein the query engine step of receiving user weight data comprises receiving data that defines a weight value that is substantially continuously adjustable in the range of zero to one.

31. A program product as defined in claim 27, wherein the query engine step of testing the received data includes checking to ensure that the sum of the weight data is equal to one.

32. A program product as defined in claim 27, wherein the query engine step of testing the received user weight data comprises the steps of:

determining if the collection of weight data values $\Theta = \{\theta_1, \theta_2, \ldots, \theta_m\}$ is ordered so that $\theta_1 >= \theta_2 \ldots >= \theta_m$; and ordering the user weight data in descending order if the step of determining shows that it was not so originally ordered.

33. A program product as defined in claim 27, further including the step of retrieving database matches that satisfy the weighted combinational function.

34. A program product as defined in claim 27, wherein determining a new combinational scoring function over the weighted collection of base functions comprises applying a General Weighting Rule, with the General Weighting Rule given by the following: $f(X) = m\theta_m b_{\{1, 2, \ldots, i\}}(X) + \Sigma i(\theta_i - \theta_{i+1}) b_{\{1, 2, \ldots, i\}}(X)$.

35. A program product as defined in claim 27, wherein the steps executed by the query engine further comprise receiving a base combinational function.

36. A program product as defined in claim 35 wherein the base combinational function that the query engine receives is the minimum function.

37. A program product as defined in claim 35 wherein the base combinational function that the query engine receives is the maximum function.

38. A program product as defined in claim 35 wherein the base combinational function that the query engine receives is the geometric mean function.

39. A program product as defined in claim 35 wherein the base combinational function that the query engine receives is the Euclidean distance function.

* * * * *